United States Patent [19]

Prebensen

[11] 4,182,424
[45] Jan. 8, 1980

[54] DRILL STEEL CENTRALIZER
[75] Inventor: Sören P. Prebensen, Nacka, Sweden
[73] Assignee: Atlas Copco Aktiebolag, Nacka, Sweden
[21] Appl. No.: 882,137
[22] Filed: Feb. 28, 1978
[30] Foreign Application Priority Data
    Mar. 3, 1977 [SE] Sweden .................. 7702346
[51] Int. Cl.² .............................. E21C 9/00
[52] U.S. Cl. ...................... 175/211; 175/210; 175/220; 408/174
[58] Field of Search ............... 175/220, 209, 210, 211; 308/4 A, 4 R; 408/174

[56] References Cited
U.S. PATENT DOCUMENTS

| 2,475,429 | 7/1949 | Humason | 175/210 |
| 2,590,958 | 4/1952 | Goodrich | 175/209 |
| 2,646,256 | 7/1953 | Lobbert | 175/209 |
| 2,913,226 | 11/1959 | Pritchard et al. | 175/209 |
| 3,991,838 | 11/1976 | Clark | 175/210 |

FOREIGN PATENT DOCUMENTS 466324  6/1975  U.S.S.R. .................. 175/209

Primary Examiner—William F. Pate, III
Attorney, Agent, or Firm—Frishauf, Holtz, Goodman & Woodward

[57] ABSTRACT

A feed beam for a rock drill has a drill steel centralizer at its front end. The centralizer comprises a thick, cylindrical rubber sleeve which has a clearance to the drill steel. An annular piston is arranged to axially compress the rubber sleeve axially so that it is radially deformed into contact with the drill steel to centralize the drill steel. The centralizer is built together with a dust collecting hood.

15 Claims, 7 Drawing Figures

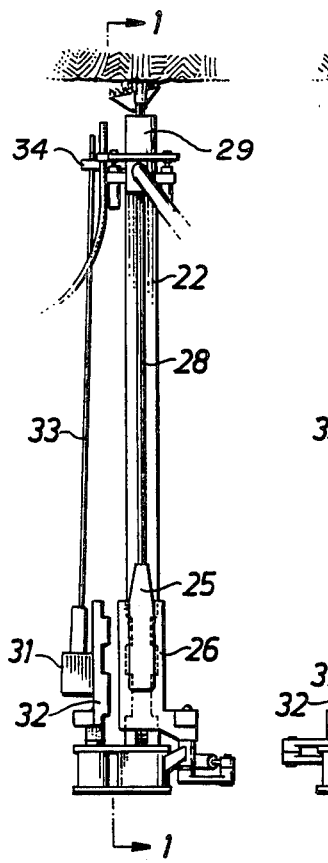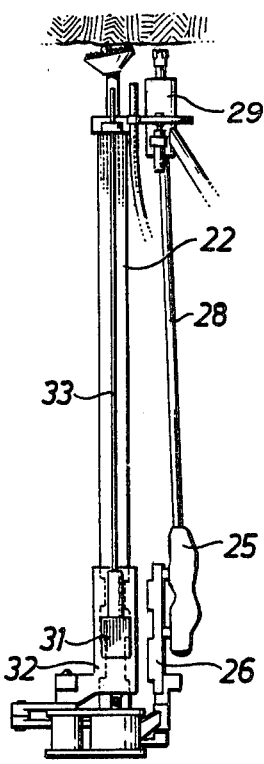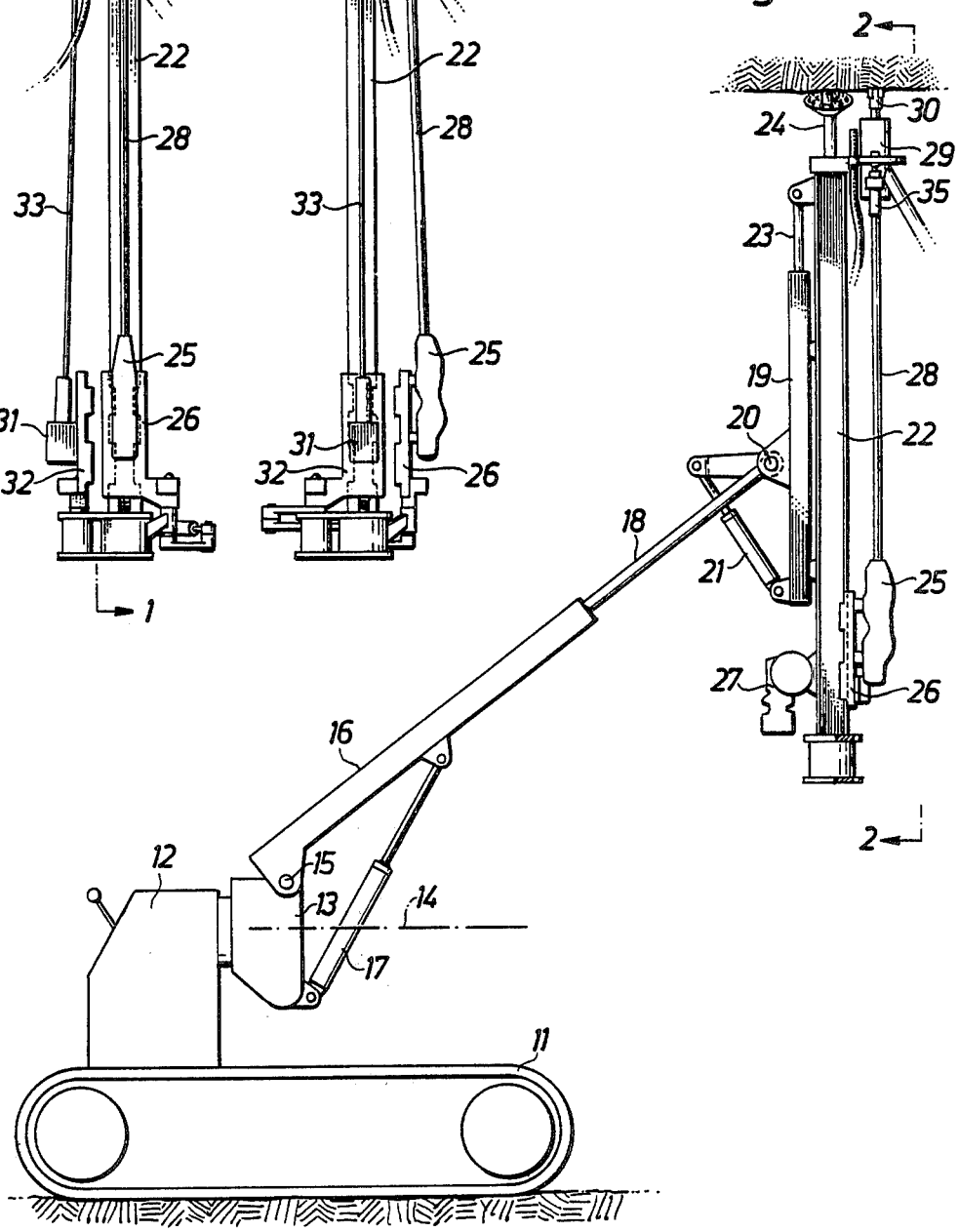

DRILL STEEL CENTRALIZER

REFERENCE TO PATENTS PERTINENT TO THE INVENTION

U.S. Pat. Nos. 3,565,187 and 3,889,959
German Offenlegungsschrift DT-OS 22 35 356

This invention relates to a feed beam for a rock drill that has a drill stem centralizer at its front end.

The drill stem must be guided when collaring a bore hole. If the drill steel is not correctly guided, the bore hole will not be collared on the correct spot, which will make the hole mal-directed and bow-formed. It is particularly essential that the bore hole is on the correct spot when a rock bolting apparatus is used which permits both drilling of the hole and insertion of a rock bolt in the hole in a sequence since the rock bolt must not miss the bore hole.

It is an object of the invention to provide a feed beam that provides for an accurate centralization of the drill stem.

BRIEF DESCRIPTION OF THE DRAWINGS

FIG. 1 shows in a side view a rock bolting apparatus that includes a feed beam according to the invention, a bolt setting device being cut away in order to make the drawing more clear, FIG. 2 is a view seen as indicated by arrows 2—2 in FIG. 1, FIG. 3 is a view similar to FIG. 2 but it shows some details in other positions.

DETAILED DESCRIPTION OF TWO PREFERRED EMBODIMENTS

Figure 4:
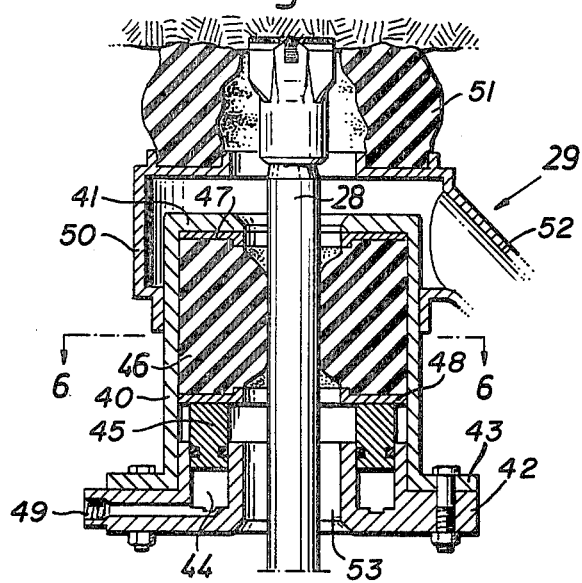
FIGS. 4 and 5 are side views on a larger scale of a rock drill centralizer shown in FIG. 1.

In FIG. 1, a crawler wagon 11 is shown which has an upright frame portion 12 on which a holder 13 is turnably mounted to be turned about a horizontal axis 14 by means of a non-illustrated motor. The holder 13 carried by means of a pivot 15 the inner end of a boom 16 that is swingable by means of a hydraulic cylinder 17. The boom 16 is telescopically extensible and its outer portion 18 carries a feed beam holder 19 that is swingable about a pivot 20 by means of a hydraulic cylinder 21. The feed beam holder 19 carries a feed beam 22 which is axially displacable relative to the holder 19 by means of a hydraulic cylinder that is located inside the holder 19 and has a piston rod 23.

The feed beam 22 has a support 24 that is hydraulically extendible against the rock face. A percussion rock drill 25 is mounted on a slide or cradle 26 that is slidably mounted on the feed beam 22 as shown in FIG. 1. The rock drill 25 is coupled to a drill steel 28 (drill stem) that is guided by a drill steel centralizer unit 29 mounted on the front end of the feed beam 22. The drill steel centralizer unit 29 can be axially moved by two hydraulic jacks 35. In order to make FIG. 1 more clear, a bolt setting device 31 for simultaneously feeding and rotating a rock bolt into a bore hole has been cut away. The bolt setting device 31 is however shown in FIGS. 2 and 3. In FIG. 2, the rock drill 25 is shown in its working position with its cradle 26 sliding on the feed beam 22 while the bolt setting device 31 with its cradle 32 and a rock bolt 33 is shown swung away. When a hole has been drilled, the rock drill 25 and its cradle 26 are swung away, and the bolt setting device 31 with its cradle 32 and a bolt 33 is instead swung into working position slidably on the feed beam 22 as shown in FIG. 3. Simultaneously, the drill steel centralizer unit 29 is swung away and a rock bolt centralizer 34 is instead swung into alignment with the bore hole. The bore hole must be started correctly, otherwise the rock bolt 33 will miss the bore hole. The drill steel centralizer unit 29 reduces the risk of incorrect collaring of the bore hole.

Figure 5:
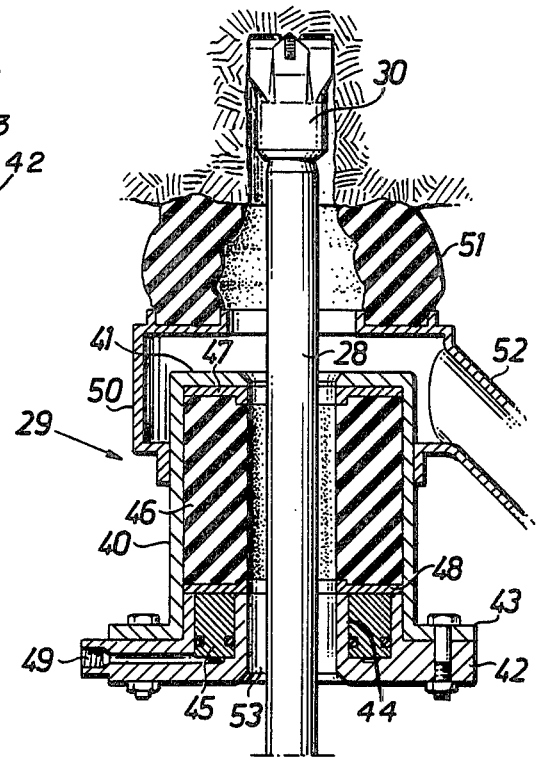
Figure 6:
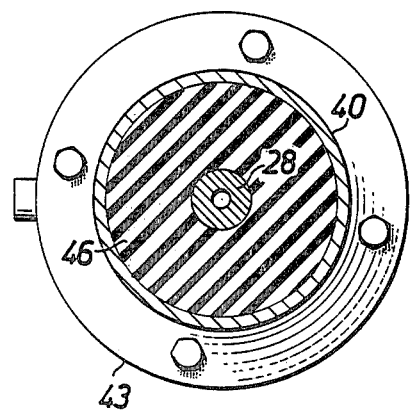
FIG. 6 is a section seen as indicated by arrows 6—6 in FIG. 4.

The centralizer unit 29 is shown on a larger scale in FIGS. 4-6. In FIG. 4 it is shown in use during collaring and in FIG. 5 it is shown during the pursuant drilling. It comprises a cylindrical housing 40 that has an annular inwardly directed flange 41 at its front end and an annular backhead 42 screwed to a flange 43 at its other end. The backhead 42 forms an annular cylinder 44 for an annular piston 45. A thick rubber sleeve 46 is lightly braced between two washers 47,48. The washer 47 is supported by the flange 41 and the washer 48 is supported by the backhead 42 (FIG. 5). A conduit 49 leads to the cylinder 44 at the back of the annular piston 45. A dust collecting hood 50 is welded to the housing 40 and it carries a flexible annular sleeve 51 that seals against the roof when the centralizer unit 29 is moved against the roof by the hydraulic jacks 35. The sleeve 51 can be made of sponge-like rubber. The hood 50 has an outlet 52 to which a suction hose can be coupled to suck away the drill dust and the flushing fluid (water or air) that flows out of the bore hole. The hole through the centralizer unit 29 is wide enough to permit for the drill bit 30 to be passed through the centralizer unit 29. The air flow sucked through the clearance 53 between the drill steel 28 and the sleeve 46 (FIG. 5) and in to the hood 50 acts as a seal to prevent the drill dust and flushing fluid from escaping backwardly along the drill steel.

When starting a new hole, the cylinder chamber 44 is pressurized by compressed air so that the piston 45 moves and axially compresses the sleeve 46 as shown in FIG. 4. As a result, the sleeve 46 is radially deformed to contact, support and centralize the drill steel 28 without preventing the rotation of the latter. The housing 40 backs the entire outer surface of sleeve 46 also when the latter is deformed, which improves the centralization in cases when the drill bit 30 is subject to great lateral forces. The air in the cylinder 44 may be exhausted as soon as the bore hole has a depth of some centimeters and the external centralization is not needed any more since the borehole itself provides for the guiding of the drill bit 30.

Since the operation of the centralizer unit 29 is remote controlled through the conduit 49 and it need be used only a short time for each borehole, it will not wear down too fast. Alternatively to the embodiment described above, the drill steel centralizer unit can be made with an outer housing in which the centralizer is freely rotatably journalled so that the sleeve 46 will rotate with the drill steel. Such a construction will reduce the wear on the sleeve 46.

Figure 7:
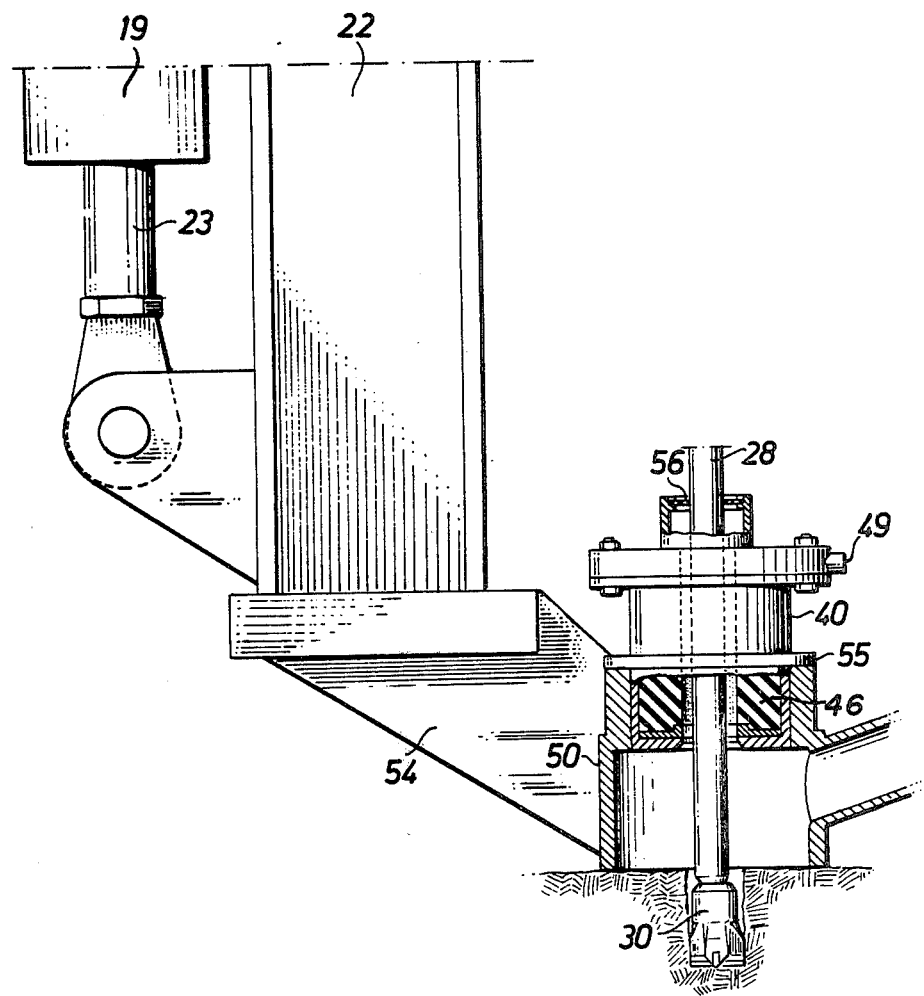
FIG. 7 shows in a longitudinal section an alternative embodiment of the front part of a feed beam.

In FIG. 7, an alternative embodiment of a feed beam is shown when used in bench drilling. In FIG. 7, elements corresponding to elements in the preceding figures have been given the same reference numerals as in the preceding figures. The suction hood 50 is welded to a bracket 54 at the front end of the feed beam 22, and it is used to support the feed beam 22 when the feed beam is thrust against the rock face. The housing 40 of the drill rod centralizer is bolted to a flange 55 on the hood 50. A flexible annular rubber diaphragm 56 is affixed to the backhead 42 to seal against the drill rod 28. The drill bit 30 can be moved through the flexible diaphragm 56 and through the sleeve 46.

What I claim is:

1. In a rock drill apparatus comprising an elongate structure; a rock drill; a cradle carrying the rock drill and mounted on said elongated structure to be axially movably guided therealong; motor means coupled to the cradle for feeding the cradle along said elongate structure; and a drill stem centralizer mounted on the front end of said elongate structure;

the improvement wherein said drill stem centralizer comprises:

an annular housing (40);

a sleeve (46) of an elastomeric material rigidly supported in the annular housing, an annular surface of said annular housing providing a firm radial support for the outer suface of said sleeve, said sleeve surrounding a portion of the length of the drill stem and normally having a clearance to the drill stem; and a pressure fluid actuated piston (45) coupled to said sleeve for axially compressing said sleeve to cause said sleeve to expand inwardly, said annular surface of said housing radially supporting the outer surface of said sleeve to force said sleeve to expand inwardly during said axial compression thereof to reduce said clearance and firmly engage the drill stem to centralize the drill stem when said sleeve is compressed axially.

2. Apparatus according to claim 1, wherein said piston (45) is annular.

3. Apparatus according to claim 2, wherein said housing (40) has a removable annular backhead (42) that forms an annular cylinder (44) for said annular piston (45).

4. Apparatus according to claim 1 further comprising a suction hood (50, 51) coupled to said centralizer for collecting drill dust flowing out of the borehole, said suction hood having an outlet (52) adapted to be connected to a vacuum source.

5. Apparatus according to claim 4, wherein said suction hood (50) comprises an elastic annular seal (51) against the rock face.

6. Apparatus according to claim 4, wherein said suction hood (50) and the centralizer (29) are mouned on said elongate structure to be movable as a unit in the axial direction of the drill stem.

7. Apparatus according to claim 6, further comprising power means (35) coupled to said suction hood (50) and to said centralizer (29) to axially displace said suction hood (50) and said centralizer (29) relative to said elongate structure.

8. Apparatus according to claim 1, wherein said elastomeric sleeve is a thick rubber cylindrical sleeve.

9. Apparatus according to claim 8, wherein said thick rubber sleeve contacts, supports and centralizes the drill stem, without preventing rotation of the drill stem relative to said sleeve when said sleeve is compressed axially.

10. In a rock drill apparatus comprising an elongate structure; a rock drill; a cradle carrying the rock drill and mounted on said elongate structure to be axially movably guided therealong; motor means coupled to the cradle for feeding the cradle along said elongate structure; a rigid suction hood rigidly mounted on the front end of said elongate structure and arranged to engage the rock face and support said elongate structure when said elongate structure is forced against the rock face; and a drill stem centralizer mounted to the rear end of said suction hood;

the improvement wherein said drill stem centralizer comprises:

an annular housing;

a sleeve of an elastomeric material rigidly supported in the annular housing, an annular surface of said annular housing providing a firm radial support for the outer surface of said sleeve, said sleeve surrounding a portion of the length of the drill stem and normally having a clearance to the drill stem; and a pressure fluid actuated piston coupled to said sleeve for axially compressing said sleeve to cause said sleeve to expand inwardly, said annular surface of said housing radially supporting the outer surface of said sleeve to force said sleeve to expand inwardly during said axial compression thereof to reduce said clearance to firmly engage the drill stem to centralize the drill stem when said sleeve is compressed axially.

11. Apparatus according to claim 10, wherein said elastomeric sleeve is a thick rubber cylindrical sleeve.

12. Apparatus according to claim 11, wherein said thick rubber sleeve contacts, supports and centralizes the drill stem, without preventing rotation of the drill stem relative to said sleeve when said sleeve is compressed axially.

13. Apparatus according to claim 10, wherein said rigid suction hood is integrally formed with the portion of said annular housing which provides said firm radial support for the outer surface of said sleeve.

14. Apparatus according to claim 10, wherein said piston (45) is annular.

15. Apparatus according to claim 10, wherein said suction hood comprises an outlet adapted to be connected to a vacuum source.

* * * * *